United States Patent [19]

Maeda

[11] Patent Number: 5,153,872
[45] Date of Patent: Oct. 6, 1992

[54] INFORMATION RECORDING DEVICE THAT ELIMINATES CROSS-TALK USING INVERSE COMPONENTS THEREOF

[75] Inventor: Takanori Maeda, Tokorozawa, Japan

[73] Assignee: Pioneer Electronic Corporation, Tokyo, Japan

[21] Appl. No.: 536,870

[22] Filed: Jun. 12, 1990

[30] Foreign Application Priority Data

Jun. 12, 1989 [JP] Japan ................................. 1-148589

[51] Int. Cl.$^5$ .............................................. G11B 7/00
[52] U.S. Cl. .................................... 369/124; 369/133; 358/328
[58] Field of Search ................. 369/102, 111, 88, 124, 369/133, 107; 360/9.1, 33.1; 358/335, 342, 340, 328

[56] References Cited

U.S. PATENT DOCUMENTS

| | | | |
|---|---|---|---|
| 3,896,271 | 7/1975 | Ishigaki et al. | 369/88 |
| 3,946,165 | 3/1976 | Cooper | 369/88 |
| 4,290,082 | 9/1981 | Hirai | 360/33.1 |
| 5,016,111 | 5/1991 | Sakamoto et al. | 358/328 |

Primary Examiner—Roy N. Envall, Jr.
Assistant Examiner—Paul W. Huber
Attorney, Agent, or Firm—Sughrue, Mion, Zinn, Mapceak & Seas

[57] ABSTRACT

There is disclosed an information recording device composed of a memory for storing an original signal from a plurality of adjacent tracks, and a computational circuit for generating an inverse number component of a crosstalk component which is considered to be mixed in during a reproduction process on the basis of storage data from the memory to provide an actual recording signal as a product of the inverse number component and the original signal to record the actual recording signal onto the recording medium, thereby canceling a crosstalk component produced at the time of reading by the inverse number component of the crosstalk component included in the actual recording signal when the actual recording signal has been read.

5 Claims, 3 Drawing Sheets

TRACK  Tn+2  Tn+1  Tn  Tn-1  Tn-2

INFORMATION RECORDING DEVICE THAT ELIMINATES CROSS-TALK USING INVERSE COMPONENTS THEREOF

BACKGROUND OF THE INVENTION

This invention relates to a recording device for recording, in a track form, information such as music signals, etc. on a recording medium such as an optical disk, etc., and more particularly to a device for processing signals indicative of recorded information.

Recording media such as an optical disk, etc. have a so called track structure in which recording is conducted by signal pits arranged in a spiral manner from the inner circumferential side to the outer circumferential side.

In an information recording/reproducing device using a recording medium with such a track structure, a transmission type optical disk device is known. Such a transmission type optical disk device functions as follows. At the time of recording, a signal source modulates a signal to be recorded (hereinafter referred to as "an original signal") in accordance with an amplitude modulation system to output a modulated original signal in the form of a time-series signal. The outputted original signal is converted into a laser beam corresponding to the intensity of the original signal by a cutting unit. The modulated light signal thus obtained is converged and the optical disk is then exposed to the modulated light signal. In this way, the original signal is recorded on a medium in a spiral manner in the form of trains of bright and dark photosensitive areas corresponding to the intensity of the original signal.

On the other hand, at the time of reproduction of the medium, the modulated signal is read by the pickup unit. A laser beam emitted from a semiconductor laser is converged on the recording surface of the optical disk by an objective lens. The diameter of a light spot formed on the recording surface of the optical disk by convergency of the laser beam is determined at a value that it is irradiated only onto a track to be traced (target track) but is not spread over other adjacent tracks. This prevents occurrence of leakage or mixing of a read signal from adjacent tracks into the target track. The laser beam thus irradiated is transmitted through the optical disk and is then incident to a photodetector provided on the opposite side of the semiconductor laser. The read signal which has been subjected to photoelectric conversion is reproduced.

The problem with the above-mentioned conventional recording/reproducing device is that recording density cannot be increased to a value more than the diameter of the light spot.

Namely, it is conceivable to narrow the spacing or interval between adjacent tracks in order to increase the recording density. The diameter of the light spot must be reduced in correspondence with the reduction of the interval between adjacent tracks. However, the diameter of the light spot is restricted by the performance (converging ability) of the objective lens, the wavelength of the laser beam, and the like. When an attempt is positively made to reduce the diameter of the light spot, it is required to use an objective lens having a high converging ability, and it is also required to conduct the tracking or the focusing control with a high accuracy. Such requirements result in disadvantages such that the device becomes complicated and/or its cost is increased.

SUMMARY OF THE INVENTION

It is an object of the present invention to provide an information recording device capable of precisely conducting a reproducing operation and improving the recording density without allowing the arrangement of a reproducing unit to be complicated, and without using a pickup having a remarkably high accuracy.

According to this invention, there is provided an information recording device comprising signal processing means for processing an original signal to be recorded onto a recording medium so as to generate an actual recording signal to be actually recorded onto the recording medium, and recording means for recording the actual recording signal onto the recording medium in a track form, wherein the signal processing means comprises memory means for memorizing original signals, corresponding to a plurality of tracks, comprising a target original signal on a target track and adjacent original signals on tracks adjacent thereto, and computation means for computing a linear combination of the target original signal and a target actual recording signal to be recorded onto the target track by a coupling coefficient generated from the adjacent original signals on the basis of storage data from the memory means to output the target actual recording signal.

In accordance with this invention, the original signals corresponding to a plurality of tracks including original signals to be recorded onto the target track (arbitrary track) (, which will be referred to herein as "a target original signal") and original signals to be recorded onto the tracks adjacent thereto (hereinafter each referred to as "an adjacent original signal") are stored into the memory means. It is to be noted that these original signals are at the same position (e.g., in the case of the optical disk, the same position in a normal direction of the track) of the recording medium. The original signal data thus memorized are used as the data for computation in the computation means.

The computation means allows existence of any crosstalk produced from the adjacent tracks at the time of reproduction, and generates an actual recording signal in which a signal level corresponding to such crosstalk is taken into consideration. Namely, when it is assumed that any signal level of crosstalk component is mixed into the read signal at the time of reproduction, the reciprocal (inverse) number of that crosstalk component is set as a coupling coefficient to compute a linear combination of the original signal and the read signal by that coupling coefficient. In accordance with the invention the crosstalk component is removed, thus making it possible to estimate a true original signal. When there is employed an approach to include a coupling coefficient, as inverse number component of a crosstalk component which is considered to be produced at the time of reproduction, into an actual recording signal to be recorded onto the recording medium, it should be expected that even if any crosstalk component is mixed into the read signal at the time of reproduction, it may be canceled by that included coupling coefficient, thereby resulting in the fact that the read signal is equivalent to the original signal.

As stated above, in accordance with this invention, a crosstalk component is securely removed even if the focusing accuracy of the pickup device is somewhat lower, thus making it possible to extract a true original signal. This operation leads to an improvement in the recording density, simplification in the configuration of the device, and an improvement in the reading accuracy.

DESCRIPTION OF THE PREFERRED EMBODIMENT

As conductive to a full understanding of the nature and utility of this invention, a brief consideration of a typical conventional information device will be first presented below with reference to FIGS. 3 to 5 principally for the purpose of comparison therebetween.

The recording medium such as an optical disk has a so called "track structure" in which recording is conducted by forming signal pit trains arranged in a spiral manner from the inner circumferential side toward the outer circumferential side.

In an information recording/reproducing device using a recording medium having such a track structure, transmission type optical disk device is known. This device is shown in FIG. 3. In FIG. 3, at the time of recording, a signal source 1 modulates a signal to be recorded (hereinafter referred to as "an original signal Q") in accordance with an amplitude modulation system to output a modulated signal in the form of a time-series signal. The outputted original signal Q is modulated or converted into a laser beam corresponding to the intensity of the original signal by a cutting unit 2. A modulated light signal P is converged and an optical disk 3 is then exposed to the modulated light signal P. In this way, the original signal Q is recorded in a spiral manner on the optical disk 3 in the form of bright and dark photosensitive areas corresponding to the intensity of the original signal Q.

Figure 4:
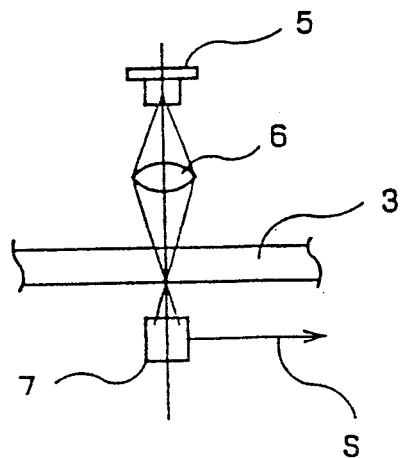
FIG. 4 is a schematic view of a conventional recording/reproducing device.
Figure 5:
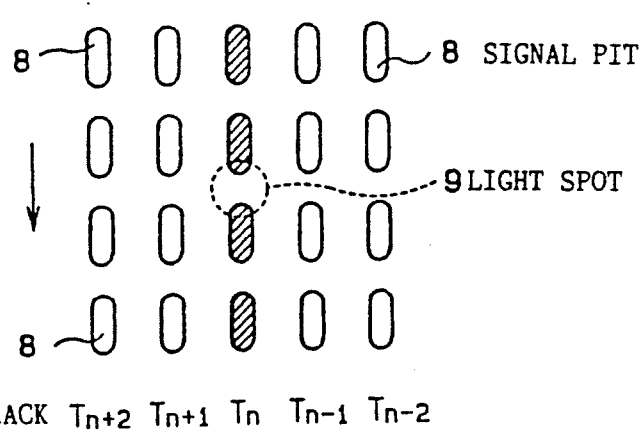
FIG. 5 is an explanatory view of a conventional light spot.

On the other hand, at the time of reproduction, the modulated signal P is read by a pickup 4, the outline of the arrangement of the pickup 4 is shown in FIG. 4. In FIG. 4, a laser beam emitted from a semiconductor laser 5 is converged on the recording surface of the optical disk 3 by an objective lens 6. As shown in FIG. 5, the diameter of a light spot 9 formed on the recording surface, having a train of signal pits 8, of the optical disk 3 by convergency of light, is set to a value such that the light spot is irradiated only onto a track to be traced (target track) $T_n$, but is not spread over other adjacent tracks $T_{n-1}$, $T_{n+1}$ to avoid occurrence of leakage of a reading signal from adjacent tracks into the target track $T_n$. The laser beam thus irradiated is transmitted through the optical disk 3 and is then incident to a photodetector 7 provided on the opposite side of the semiconductor laser 5. The read signal S which has been subjected to photoelectric conversion is reproduced.

A preferred embodiment of this invention will now be described with reference to the attached drawings.

CONSTRUCTION

Figure 1:
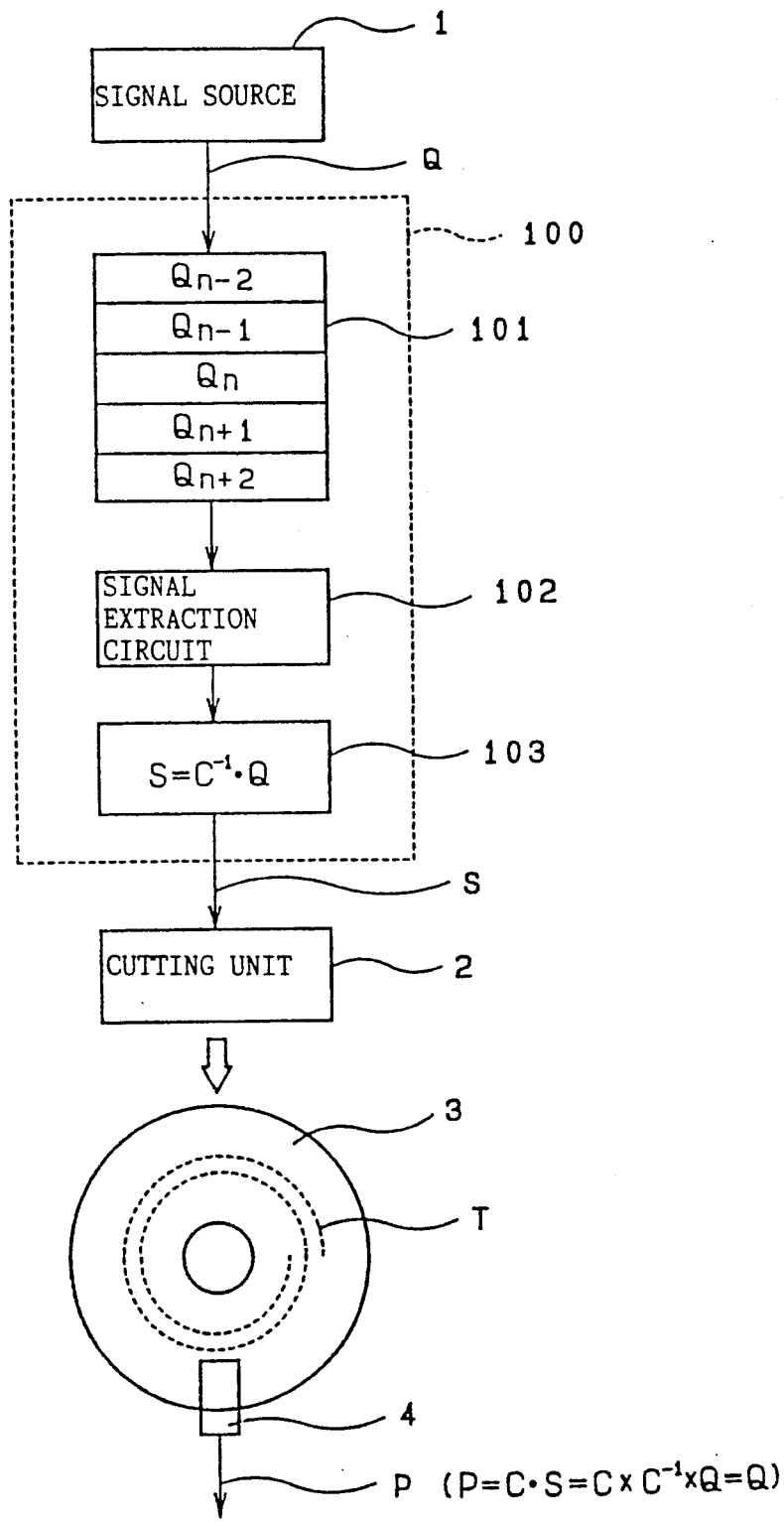
FIG. 1 is a block diagram showing an embodiment of this invention.

A preferred embodiment of this invention is shown in FIG. 1. In this embodiment, this invention is applied to a transmission type optical disk device. The same reference numerals are attached to portions also shown in FIGS. 3 to 5, respectively, and their explanation will be omitted.

Figure 3:
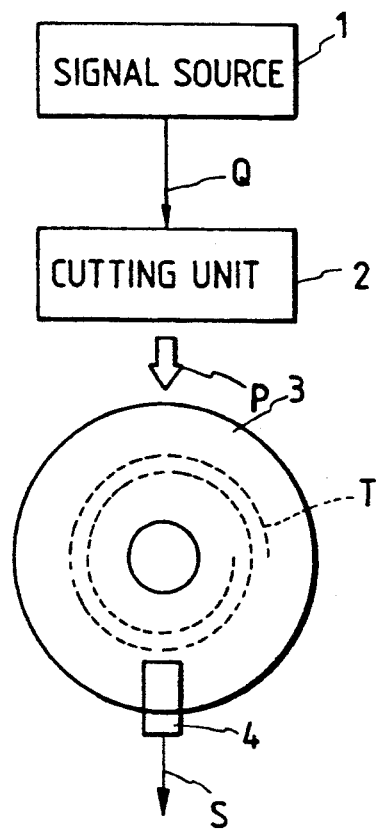
FIG. 3 is a block diagram of prior art.

The embodiment shown in FIG. 1 differs from the embodiment shown in FIG. 3 only in that a signal processing unit 100 is provided between the signal source 1 and the cutting unit 2. This signal processing unit 100 is roughly composed of a memory circuit 101, a signal extraction circuit 102, and a computation circuit 103.

The memory circuit 101 includes a plurality of memory areas for storing signal Q data corresponding to a plurality of tracks on the recording medium 3. In this embodiment (FIG. 1), the memory circuit 101 includes memory areas for storing original signal Q data $Q_{n-2}$, $Q_{n-1}$, $Q_n$, $Q_{n+1}$, and $Q_{n+2}$ corresponding to five tracks including target track $T_n$, adjacent tracks $T_{n-2}$, and $T_{n-1}$ adjacent on the inner circumferential side thereof, and adjacent tracks $T_{n+1}$, $T_{n+2}$ adjacent on the outer circumferential side thereof. The number of storage data is not limited to five data as in this embodiment, but generally may be a plurality of data. It can be said that the computation accuracy which will be described later is improved as the number of data increases. However, when the memory capacity and the computational accuracy of the memory circuit 101 is taken into consideration, three to five storage data may be taken from a practical point of view.

The signal extraction circuit 102 serves to extract, from the storage data in the memory circuit 101, original signal Q data arranged at the same position in a normal (radial) direction of the optical disk 3. Namely, when data corresponding to three tracks are assumed to be stored in the memory circuit 101, the signal extraction circuit 102 extracts an original signal Q data $Q_n$ on the target track $T_n$, the original signal Q data $Q_{n-1}$ on the adjacent track $T_{n-1}$ on the inner circumferential side thereof, and the original signal Q data $Q_{n+1}$ on the adjacent track $T_{n+1}$ on the outer circumferential side thereof. The original signal Q data thus extracted is subjected to computation at the computation circuit 103.

Although described in detail later, the computation circuit 103 performs a computation of a linear combination using, as a coupling coefficient, an inverse number component $C^{-1}$ of a crosstalk component C which may be mixed in during a reproduction process in the case where the optical disk 3 recorded by this recording device is reproduced, thus to compute an actual recording signal S. Namely, the computation circuit 103 performs a computation expressed below:

$$S = C^{-1} \cdot Q \tag{1}$$

where S is an actual recording signal vector on an target track, $C^{-1}$ is an inverse matrix, and Q is an original signal vector on the target track.

OPERATION

The operation of the information recording device thus constructed will now be described.

For assisting a understanding of the description, an explanation will be first made in connection with the crosstalk at the time of reproduction. It is now assumed that the target track $T_n$ is traced and the intensity of a record signal $S_n$ on the target track $T_n$ is 1. On the above premise, in the case where any other read signal from the adjacent tracks $T_{n-1}$ and $T_{n+1}$, which is $\alpha$ times $(0<\alpha<1)$ the read signal $P_n$, is mixed into the read signal $P_n$ as a crosstalk, read signal $P_n$ obtained from the pickup 4 is expressed as follows:

$$P_n = \alpha S_{n-1} + S_n + \alpha S_{n+1} \quad (2)$$

where $S_{n-1}$ and $S_{n+1}$ are read signals on adjacent tracks $T_{n-1}$ and $T_{n+1}$ arranged at the same position on a normal line, respectively. This is expressed as follows by a matrix having values on tracks as respective elements:

$$P = C \times S \quad (3)$$

When the number of the entire tracks is assumed to be N, the above matrix representation is rewritten in the component form as follows:

$$\begin{bmatrix} P_1 \\ P_2 \\ \ldots \\ P_{n-2} \\ P_{n-1} \\ P_n \\ P_{n+1} \\ P_{n+2} \\ \ldots \\ P_{N-1} \\ P_N \end{bmatrix} = \begin{bmatrix} 1 & \alpha & 0 & 0 & . & . & . & . & . & 0 \\ \alpha & 1 & \alpha & 0 & . & . & . & . & . & 0 \\ . & . & . & . & . & . & . & . & . & . \\ 0 & . & \alpha & 1 & \alpha & 0 & . & . & . & 0 \\ 0 & . & 0 & \alpha & 1 & \alpha & 0 & . & . & 0 \\ 0 & . & . & 0 & \alpha & 1 & \alpha & 0 & . & 0 \\ 0 & . & . & . & 0 & \alpha & 1 & \alpha & 0 & 0 \\ 0 & . & . & . & . & 0 & \alpha & 1 & \alpha & . & 0 \\ . & . & . & . & . & . & . & . & . & . \\ 0 & . & . & . & . & . & . & 0 & \alpha & 1 & \alpha \\ 0 & . & . & . & . & . & . & . & 0 & \alpha & 1 \end{bmatrix} \times \begin{bmatrix} S_1 \\ S_2 \\ \ldots \\ S_{n-2} \\ S_{n-1} \\ S_n \\ S_{n+1} \\ S_{n+2} \\ \ldots \\ S_{N-1} \\ S_N \end{bmatrix}$$

In the case of the conventional device, since the recording signal S is virtually the same as the original signal Q, unless an approach is employed to allow the value of $\alpha$ to be as small as possible (i.e., to reduce crosstalk), the value of the read signal P becomes a value different from the record signals S. As a result, signals are unable to be correctly reproduced.

In view of the above, this invention adopts a scheme to determine in advance an inverse matrix $C^{-1}$ of the crosstalk matrix C to compute an actual recording signal vector S expressed below assuming that the original signal is expressed as $Q\{q_n\}$ to record it onto the optical disk 3:

$$S = C^{-1} \times Q \quad (4)$$

In the case that a crosstalk C is mixed into its read signal vector P, at the time of reading this actual recording signal vector S by means of the pickup 4, this reading signal vector P is expressed as follows:

$$\begin{aligned} P &= C \times S \\ &= C \times (C^{-1} \times Q) \\ &= Q \end{aligned} \quad (5)$$

Figure 2:
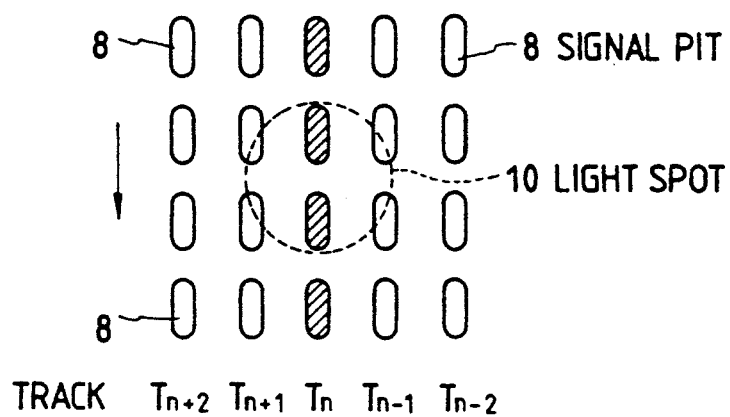
FIG. 2 is an explanatory view of a light spot.

This implies that the crosstalk component C produced at the time of reading is canceled by the inverse matrix $C^{-1}$ included in the actual record signal S. Thus, an original signal Q free from the crosstalk component can be reproduced as the read signal P in its true form. Further, since this allows occurrence of crosstalk, the diameter of the light spot 10 of the pickup may take a large value as shown in FIG. 2. Eventually, this implies that a high quality read signal can be provided even if a pickup having a high converging ability is not used as the pickup 4. To speak conversely, if a pickup 4 having a higher focusing accuracy is used, the interval between tracks can be narrowed, leading to an improvement in the recording density.

EMBODIMENT

Then, the inverse matrix $C^{-1}$ is actually calculated. Thus, the n row component $S_n$ of $S = C^{-1} \times Q$ is expressed as follows:

$$S_n = \frac{1}{1 - 6\alpha^2 + 10\alpha^4 - 4\alpha^6} \times ((1 - 4\alpha^2 + 4\alpha^4) q_n - (\alpha - 3\alpha^3 + 2\alpha^5) q_{n-1} - (\alpha - 3\alpha^3 + 2\alpha^5) q_{n+1} + (\alpha^2 - 2\alpha^4) q_{n-2} + (\alpha^2 - 2\alpha^4) q_{n+2} - (\alpha^3 - 2\alpha^5) q_{n-3} - (\alpha^3 - 2\alpha^2) q_{n+3}$$

where the coefficient of the sixth power or more of respective terms are omitted.

The result $S_n$ thus calculated can take positive and negative values, but an actual recording signal can only take positive values. Accordingly, it is necessary to add a constant to the entire values in order that this actual recording signal is not negative. This constant K is proportional to the maximum value of the non-diagonal component of $C^{-1}$ and is expressed as follows:

$$K = \frac{\alpha - 3\alpha^3 + 2\alpha^5}{1 - 6\alpha^2 + 10\alpha^4 - 4\alpha^6} \times 2 Q_{max}$$

where $Q_{max}$ is the maximum value of the target signal.

In the above equation, coefficients of the seventh power or more are omitted. When the value of K expressed by the above equation takes a value smaller than zero, the value of K can be considered to be zero.

Namely, when $K = \{K\}$ is assumed with respect to the original signal Q, recording is conducted as $S = C^{-1} \times Q + K$ and reproduction is conducted as $P' = C \times S - K$, thereby making it possible to provide a satisfactory reproduced signal.

The above-mentioned operation will now be described using numeric values in connection with an actual case. For the sake of brevity, it is assumed here that the total number N of tracks is equal to five and the crosstalk of the pickup is expressed as $\alpha = 0.2$.

The crosstalk matrix C in this case is expressed as follows:

$$C = \begin{bmatrix} 1 & 0.2 & 0 & 0 & 0 \\ 0.2 & 1 & 0.2 & 0 & 0 \\ 0 & 0.2 & 1 & 0.2 & 0 \\ 0 & 0 & 0.2 & 1 & 0.2 \\ 0 & 0 & 0 & 0.2 & 1 \end{bmatrix}$$

It is now assumed that, e.g., the original signal Q is expressed as follows:

$$Q = \begin{bmatrix} 3 \\ 0 \\ 2 \\ 1 \\ 4 \end{bmatrix}$$

where $Q_{max}$ is assumed to be four. The inverse matrix $C^{-1}$ is expressed as follows.

$$C^{-1} = \begin{bmatrix} 1.044 & -0.218 & 0.045 & -0.009 & 0.002 \\ -0.218 & 1.089 & -0.227 & 0.047 & -0.009 \\ 0.045 & 0.227 & 1.091 & -0.227 & 0.045 \\ -0.009 & 0.047 & 0.227 & 1.089 & -0.218 \\ 0.002 & -0.009 & 0.045 & -0.218 & 1.044 \end{bmatrix}$$

Since K is equal to 1.9, calculation of $S = C^{-1} \times Q + K$ is given as follows.

$$S = \begin{bmatrix} 3.220 \\ -1.098 \\ 2.273 \\ -0.265 \\ 4.053 \end{bmatrix} + \begin{bmatrix} 1.9 \\ 1.9 \\ 1.9 \\ 1.9 \\ 1.9 \end{bmatrix} = \begin{bmatrix} 5.119 \\ 0.801 \\ 4.172 \\ 1.635 \\ 5.953 \end{bmatrix}$$

Namely, when recording is conducted in advance in this way, since the reproduced signal P is expressed as $P = C \times S$, a value $P'$ obtained by subtracting K from the reproduced signal P is expressed as follows:

$$P' = P - K = \begin{bmatrix} 4.9 \\ 1.9 \\ 3.9 \\ 2.9 \\ 5.9 \end{bmatrix} - \begin{bmatrix} 1.9 \\ 1.9 \\ 1.9 \\ 1.9 \\ 1.9 \end{bmatrix} = \begin{bmatrix} 3 \\ 0 \\ 2 \\ 1 \\ 4 \end{bmatrix} = Q$$

On the contrary, a reproduced signal P by the conventional arrangement is expressed as follows:

$$P = C \times Q = \begin{bmatrix} 3.0 \\ 1.0 \\ 2.2 \\ 2.2 \\ 4.2 \end{bmatrix}$$

Accordingly, the device of this invention can conduct a more correct signal reproduction as compared to the conventional device.

By executing such a calculation over the entire circumference of the disk, it is possible to prepare recording signals over the entire circumference thereof.

It has been described in the above-mentioned embodiment that this invention is applied to the transmission type optical disk. As long as signals are recorded onto tracks by the amplitude modulation, this invention is similary applicable to a reflection type optical disk, a magnetic disk, and the like. Further, in the above-mentioned embodiment, it has been described that a medium is disk-shaped, but such a medium may take a form of a card as long as a structure including tracks arranged is used.

In the above-mentioned embodiment, only any crosstalk on adjacent tracks is considered. In addition, the effect or influence of a large number of tracks can be considered as expressed below:

$$P_n = \beta S_{n-2} + \alpha S_{n-1} + S_n + \alpha S_{n+1} + \beta S_{n+2}$$

Further, coefficients on the tracks of the outer and inner circumferential sides are not necessarily the same. These coefficients may be selected in conformity with the configuration of the reproducing system.

In addition, while terms of higher order are omitted in the calculation of the above-mentioned embodiment, such higher order terms may be taken, or a further omission may be done. For example, when calculation is stopped at the first order term, then n row diagonal component $S_n$ of the recording signal is expressed as follows:

$$S_n = -\alpha q_{n-1} + q_n - \alpha q_{n+1}$$

As stated above, this invention employs an approach to determine a quantity of crosstalk of the reproducing system to obtain a recording signal by taking the crosstalk into consideration. Accordingly, the recording density can be more improved as compared to that of the prior art. In addition, in the case of conducting a recording process at the same recording density as that of the prior art, a signal having a property equal to that of a signal of the prior art can be provided by using a pickup whose performance is inferior to that of the prior art.

What is claimed is:

1. An information recording device comprising signal processing means for processing an original signal to be recorded onto a recording medium so as to generate an actual recording signal to be actually recorded onto the recording medium, and recording means for recording, in a track form, the actual recording signal onto the recording medium, the device comprising:

memory means for memorizing original signals, corresponding to a plurality of tracks of the recording medium, the original signals comprising a target original signal to be recorded on a target track and adjacent original signals to be recorded on tracks adjacent thereto; and computation circuit means for computing a linear combination of a target original signal and a coupling coefficient generated from the adjacent original signals on the basis of storage data from said memory means to output a target actual recording signal to be recorded onto the target track.

2. An information recording device as set forth in claim 1, wherein the coupling coefficient is an inverse of a crosstalk component which is considered to be mixed in during a reproduction process.

3. An information recording device as set forth in claim 2, wherein the target actual recording signal is a product of the original signal and an inverse of a crosstalk component which is considered to be mixed in during a reproduction process.

4. An information recording device as set forth in claim 3, wherein the target actual recording signal cancels the crosstalk component produced at the time of reading by the inverse of the crosstalk component included in the target actual recording signal.

5. An information recording device as set forth in claim 1, wherein said computation circuit means includes a signal extraction circuit for extracting the original signals from the storage data in said memory means to deliver it to a computation circuit.

* * * * *